(12) United States Patent
Kremsler et al.

(10) Patent No.: US 7,621,019 B2
(45) Date of Patent: Nov. 24, 2009

(54) BLOWER APPARATUS

(75) Inventors: Dieter Kremsler, Spiegelberg (DE); Michael Hocquel, Reutlingen (DE); Klaus Langhans, Winnenden (DE); Helmut Swistun, Kernen (DE); Uwe Gaese, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 562 days.

(21) Appl. No.: 11/162,100

(22) Filed: Aug. 29, 2005

(65) Prior Publication Data

US 2006/0059654 A1  Mar. 23, 2006

(30) Foreign Application Priority Data

Sep. 22, 2004  (DE) .................. 10 2004 045 884

(51) Int. Cl.
*A47L 5/00* (2006.01)
(52) U.S. Cl. .......................... 15/405; 15/330; 15/316.1

(58) Field of Classification Search .................... 15/405, 15/316.1, 330, 317, 318, 318.1, 345
See application file for complete search history.

(56) References Cited

U.S. PATENT DOCUMENTS

| | | | | |
|---|---|---|---|---|
| 4,836,753 A * | 6/1989 | Berfield et al. | ............... | 417/236 |
| 5,245,726 A * | 9/1993 | Rote et al. | .................... | 15/339 |
| 5,285,751 A * | 2/1994 | Liegeois et al. | .......... | 123/41.63 |
| 6,004,093 A * | 12/1999 | Ishikawa | ..................... | 415/98 |
| 6,305,048 B1 | 10/2001 | Salisian | | |
| 2001/0005918 A1* | 7/2001 | Miyamoto | ................... | 15/326 |
| 2002/0174511 A1* | 11/2002 | Iida et al. | ...................... | 15/405 |
| 2003/0167594 A1* | 9/2003 | Iida et al. | ...................... | 15/405 |

* cited by examiner

*Primary Examiner*—Dung Van Nguyen
(74) *Attorney, Agent, or Firm*—Gudrun E. Huckett

(57) ABSTRACT

A blower apparatus has a blower housing having a blower intake. A motor-driven blower is arranged in the blower housing and takes in air in a flow direction through the blower intake into the blower housing. A device for mechanical clearing of the blower intake is arranged at the blower intake. The mechanical clearing device is driven in rotation during operation of the blower apparatus.

13 Claims, 2 Drawing Sheets

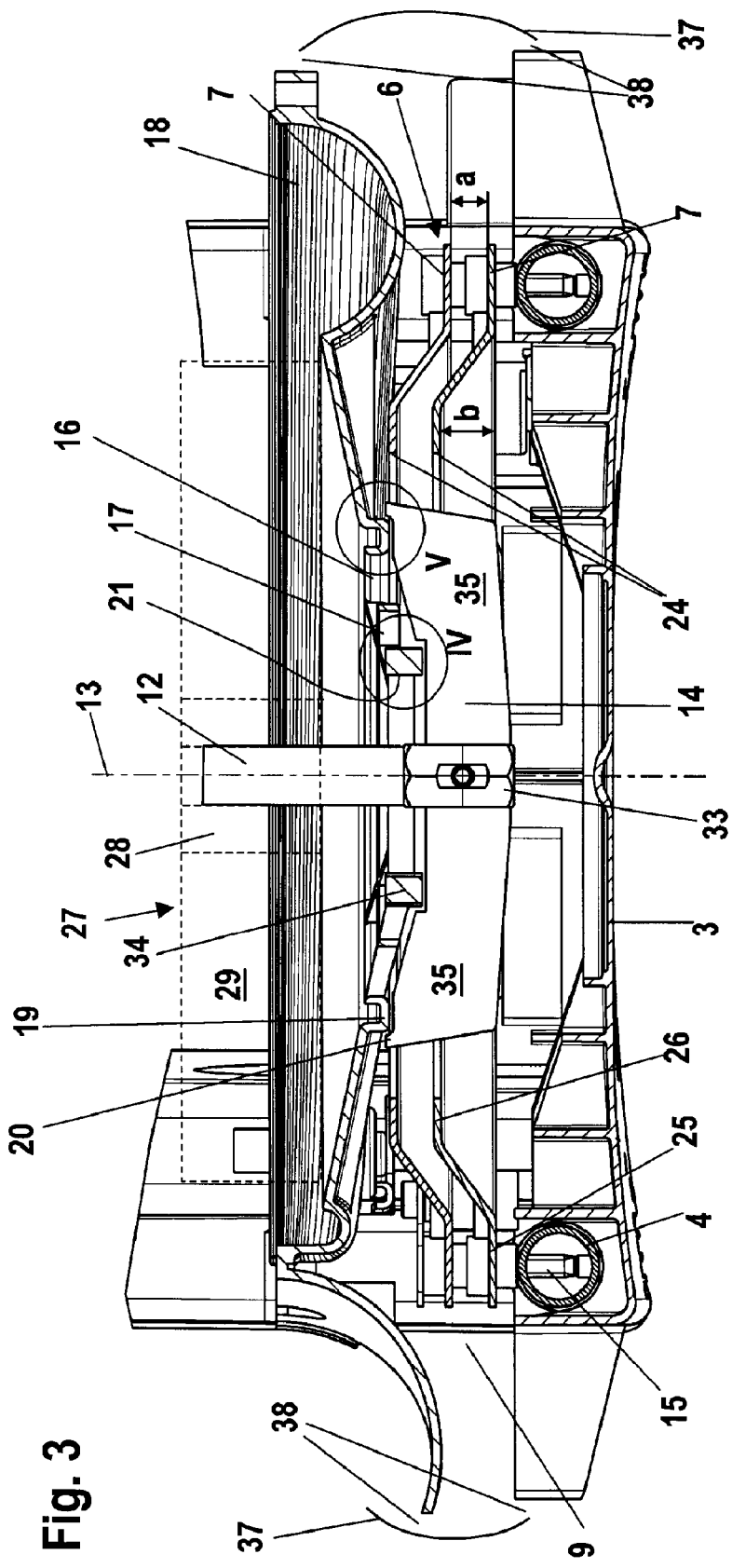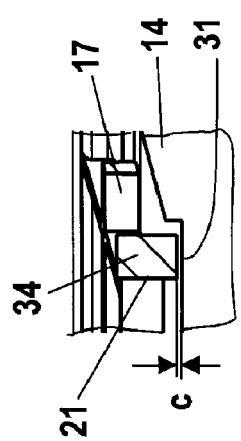

BLOWER APPARATUS

BACKGROUND OF THE INVENTION

The invention relates to a blower apparatus having a motor-driven blower that is arranged in a blower housing and takes in air into the blower housing through a blower intake.

U.S. Pat. No. 6,305,048 discloses a backpack-style blower apparatus that is carried on the back of the operator. The blower apparatus comprises a blower wheel for sucking in air. In order to prevent that dirt particles are sucked in, a screen is arranged at the intake into the blower housing. Such a screen becomes easily clogged, for example, by leaves taken up by the suction flow. Leaves or dirt particles that pass through the screen can deposit within the blower housing and can lead to clogging of the blower. In order to clean the intake into the blower housing, the operator must first remove the blower apparatus from his back; therefore, work must be interrupted every time the screen must be cleaned.

SUMMARY OF THE INVENTION

It is an object of the present invention to provide a blower apparatus of the aforementioned kind that prevents clogging of the intake of the blower.

In accordance with the present invention, this is achieved in that a mechanical clearing device for clearing the blower intake is arranged at the intake. The mechanical clearing device for clearing the blower intake enables clearing during operation of the blower apparatus. In this way, during operation of the blower apparatus, clogging of the blower intake can be permanently and securely prevented. The present invention thus differs in its basic operation from known prior art solutions that attempt to keep the blower intake free of dirt by means of screens, filters or the like and therefore entail the risk of clogging of the screen or filter.

Advantageously, the mechanical clearing device is driven in rotation during operation of the blower apparatus. In this way, a permanent clearing action is possible in a simple way. A simple embodiment results when the mechanical clearing device is a clearing plate that rotates about its axis of symmetry. Such a clearing plate can comminute sucked-in dirt and/or transport it outwardly in a radial direction so that the blower intake is kept free of dirt in a reliable way. In order to ensure that the dirt is not transported into the blower housing, in front of the blower intake a screen is arranged. The screen has advantageously an opening through which a drive means for driving the mechanical clearing device passes. A simple drive action can be achieved in that the screen for clearing is connected fixedly to the blower wheel.

Advantageously, the suction flow is realized through a suction opening that is positioned upstream of the blower intake; the suction opening is provided with an access protection device to prevent that a hand can be inserted. In this way, accidentally extending a hand into the suction opening is prevented. In particular, the blower apparatus is a backpack blower transported on the back of the operator by means of a back support plate and the suction opening extends between the back support plate and the blower housing. Particularly in the case of a backpack blower apparatus, clearing of the blower intake cannot be performed by the operator when operating the blower apparatus; the blower apparatus must be turned off, taken off the back and put down for clearing the blower intake. The mechanical clearing device therefore makes it possible to increase the effective operating time of the blower apparatus and to reduce the frequency of interruptions for maintenance or service.

Advantageously, the suction opening extends annularly about the mechanical clearing device. A simple configuration of the access protection device results when the access protection device is in the form of at least one circular ring-shaped (annular) plate. Such a plate prevents accidental insertion of a hand into the suction opening. At the same time, the plate affects the flow-cross-section only minimally so that a sufficient airflow can be achieved while the blower apparatus can still be of a small size. Such a plate can be produced in a simple way. It is provided that the access protection device has an outer section that is staggered relative to an inner section in the direction of the axis of rotation. In this way, a deflection of the sucked-in air flow is achieved. Advantageously, the access protection device is formed by at least two plates, and the spacing of the plates is smaller than the distance of staggering between the inner and the outer sections. As a result of the staggered arrangement, it is possible to prevent even for a relatively large spacing between the plates an accidental insertion of a hand into the suction opening. The staggered arrangement of the access protection device can prevent a direct exiting of dirt such as leaf particles that have been cleared by the clearing plate from the blower intake.

BRIEF DESCRIPTION OF THE DRAWING

FIG. 3 is a section of the blower housing and of the back support plate at the level of the clearing plate.

FIG. 4 is a detail illustration of the detail IV of FIG. 3.

FIG. 5 is a detail illustration of the detail V a FIG. 3.

DESCRIPTION OF THE PREFERRED EMBODIMENTS

Figure 1:
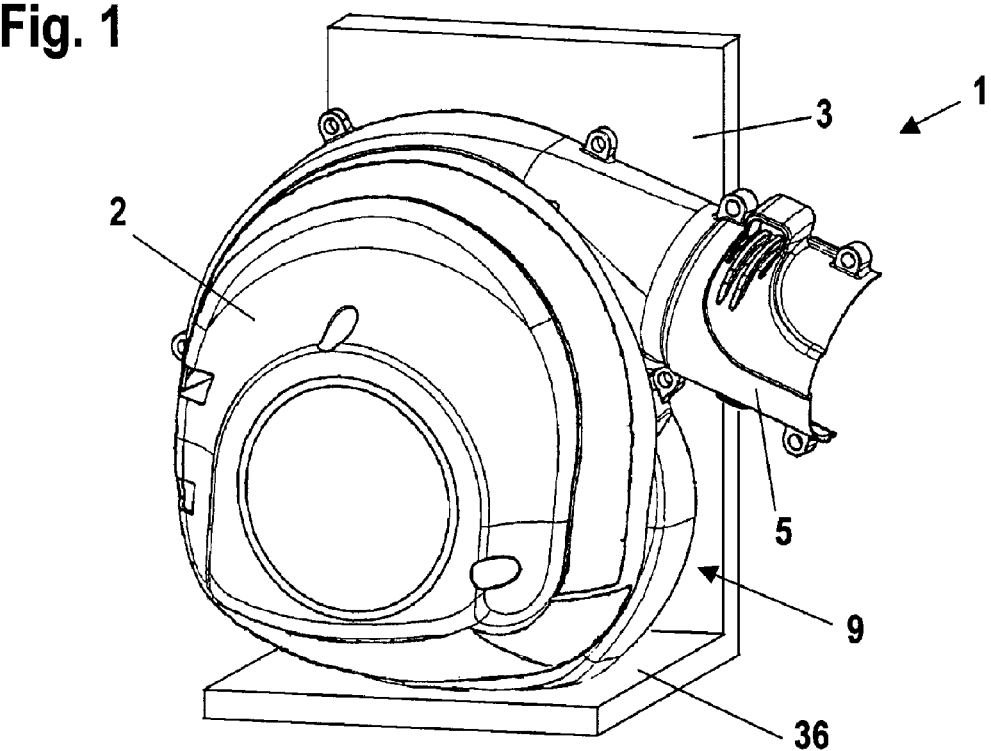
FIG. 1 is a schematic perspective illustration of a blower apparatus to be carried on the back of the operator.

The blower apparatus 1 illustrated in FIG. 1 is designed to be carried on the back of the operator (backpack blower). The blower apparatus comprises an apparatus housing 2 in which a drive motor, in particular, an internal combustion engine, is arranged. The apparatus housing 2 of the blower apparatus 1 is arranged, preferably detachably, on a back support plate 3. On the back support plate 3 carrying straps (not illustrated) are arranged with which the blower apparatus is carried on the operator's back. The blower 1 has a blower tube 5 through which air is conveyed that is sucked in through the suction opening 9 formed between the apparatus housing 2 and the back support plate 3. A horizontal section 36 is provided on the back support plate 3 on which the apparatus housing 2 can be attached by means of a base (not illustrated in FIG. 1).

Figure 2:
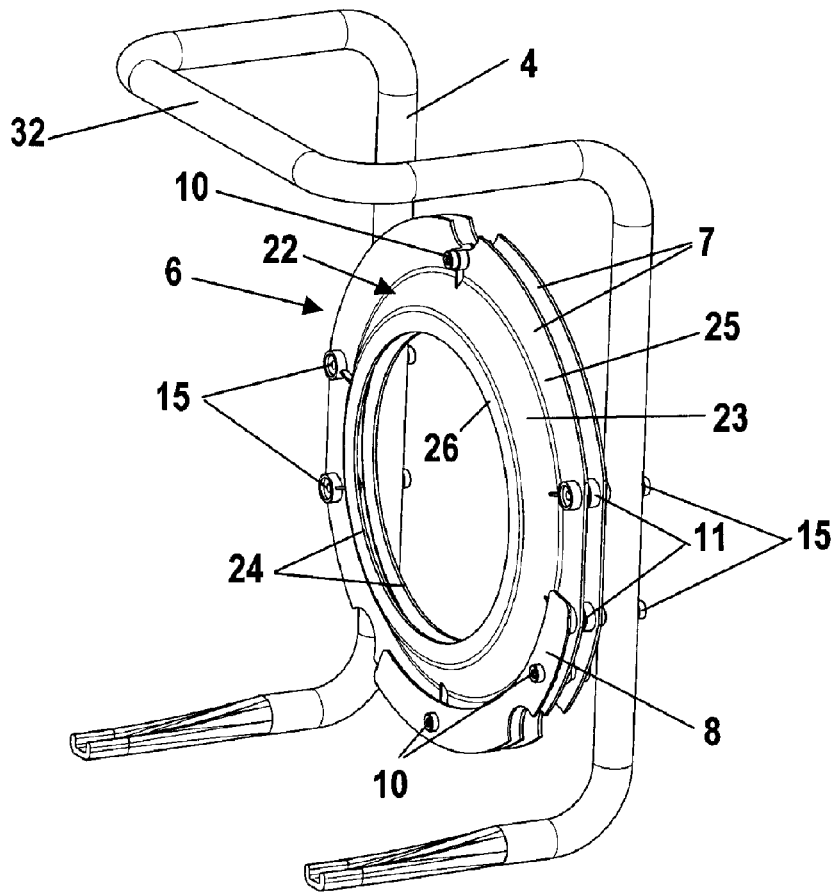
FIG. 2 is a perspective illustration of a tubular frame of the blower apparatus with access protection device arranged thereat.

In FIG. 2, the tubular frame 4 of the back support plate 3 is illustrated in a perspective view; the access protection device 6 arranged thereat is also shown. The tubular frame 4 is arranged on the back support plate 3. The tubular frame 4 has an upper section 32 so that the blower apparatus 1 is surrounded also in the upward direction by the tubular frame 4. On the upper section 32 a spraying tank can be secured so that the blower apparatus 1 can also be used as a spraying device. The access protection device 6 is attached to the tubular frame 4.

The access protection device 6 is arranged in the suction opening 9 between the apparatus housing 2 and the back support plate 3. It is comprised of two annular plates 7 as well as a plate 8 that has the shape of a segment of a circular ring. The plates 7 are connected to one another and to the plate 8 by screws 10. Between the plates 7 and 8, respectively, a spacing is provided that is achieved by the spacer sleeves 11 arranged on the screws 10. Moreover, a total of four screws 15 are provided that fasten the plates relative to one another and also fasten the access protection device 6 on the tubular frame 4; they are also provided with spacer sleeves.

Both plates 7 have a central circular opening 24. The opening 24 is surrounded by an inner section 26 of the plates 7 that extends parallel to the back support plate 3. A truncated cone-shaped section 23 adjoins the inner section 26 so that the plates 7 are bent in the direction toward the tubular frame 4. An outer section 25 adjoins the truncated cone-shaped section 23 in the radial outward direction; it extends parallel to the inner section 26 and parallel to the back support plate 3. The plate 8 extends only in the area of the outer section 25 of the two plates 7 and is plane. By means of the truncated cone-shaped section 23, a step 22 is formed between the outer sections 25 and the inner sections 26, respectively. The inner sections 26 are staggered relative to the outer sections 25.

As shown in FIG. 3, the spacing a between the two plates 7 is smaller than the spacing b between an inner section 26 and an outer section 25 of the plate 7. The suction opening 9 is formed between the back support plate 3 and the blower housing 18 that forms a part of the apparatus housing 2. The suction opening 9 is of an annular shape and extends in an area radially outside of the access protection device 6. A cover 37 is provided on the suction opening 9 radially outside of the access protection device 6; the cover 37 prevents the operator from inserting his hand into the suction opening. The cover 37 is positioned at a spacing to the apparatus housing 2 and/or to the back support plate 3 so that circumferentially extending slots 38 are formed through which the air is sucked in. The cover 37 however can also have openings, for example, in the form of a screen structure through which the suction action can be realized. The cover 37 can be provided as an alternative or in addition to the access protection device 6.

A blower wheel 27, illustrated in dashed lines in FIG. 3, is supported on a drive shaft 12 in the blower housing 18. The drive shaft 12 rotates about axis of rotation 13 in operation of the blower apparatus. The blower wheel 27 has a hub 28 that is fixedly connected to the drive shaft 12. Vanes 29 are arranged on the blower wheel 27 radially outside of the hub 28; they convey or transport air through a blower intake 16 into the blower housing 18.

The blower housing 18 is shaped like a spiral wherein at the end of the spiral having the greatest flow cross-section a blower tube 5 is arranged. Upstream of the blower intake 16, a screen 17 with a central opening 21 is arranged. The screen 17 is slanted away from the blower housing 18 in the outward direction, i.e. toward the back support plate 3, and has its smallest spacing to the back support plate 3 in the area of the opening 21. The drive shaft 12 projects through the opening 21 of the screen 17. The drive shaft 12 is preferably driven by an internal combustion engine arranged in the housing 2. A clearing plate 14 is secured on the end 33 of the drive shaft 12 arranged within the blower housing 18. The clearing plate 14 extends through an axial slot of the drive shaft 12 and is secured thereat by a screw connection. On the end 33 of the drive shaft 12, additional devices, for example, for operating a spraying device, can be secured.

The clearing plate 14 is preferably embodied to have rotational symmetry. The axis of symmetry of the clearing plate 14 coincides with the axis of rotation 13 of the drive shaft 12 of the blower wheel 27. In the area of the opening 21, the clearing plate 14 has a plane outer contour. As shown in the detail illustration of FIG. 4, the side 31 of the clearing plate 14 facing the opening 21 has spacing c relative to the screen 17.

The spacing c is selected to be so small that the dirt particles that deposit on the screen 17 are removed by the clearing plate 14. Radially outside of the ring 34 of the screen 17 that delimits the opening 21, the side 31 of the clearing plate 14 extends at a slant that matches the slant of the screen 17. The blower intake 16 is delimited by a rim 19 of the blower housing 18. The screen 17 adjoins the rim 19. The screen 17 is formed in particular as a monolithic part of the blower housing 18. In the area of the rim 19 the clearing plate 14 has a cutout 30, as illustrated in the detail view shown in FIG. 5. The cutout 30 has a spacing d relative to the rim 19 that is so small that dirt can be removed reliably. Radially outside of the cutout 30, the clearing plate 14 has an edge 20 that partially engages across the rim 19.

Instead of a clearing plate 14 that has two arms 35 arranged in a single plane and extending outwardly from the axis of rotation 13 for clearing the blower intake 16, it is also possible to provide the clearing plate with only one or with several arms.

While specific embodiments of the invention have been shown and described in detail to illustrate the inventive principles, it will be understood that the invention may be embodied otherwise without departing from such principles.

What is claimed is:

1. A blower apparatus comprising:
    a blower housing having a blower intake;
    a motor-driven blower arranged in the blower housing and taking in air in a flow direction through the blower intake into the blower housing;
    a mechanical clearing device arranged upstream of the blower intake for clearing the blower intake, wherein the mechanical clearing device transports sucked-in dirt radially outwardly so that the blower intake is kept free of dirt; and
    a screen arranged upstream of the blower intake in the flow direction;
    wherein the mechanical clearing device is driven in rotation during operation of the blower apparatus.

2. The blower apparatus according to claim 1, wherein the mechanical clearing device is a clearing plate having an axis of rotation about which axis of rotation the mechanical clearing device rotates.

3. The blower apparatus according to claim 2, wherein the clearing plate comprises two arms arranged in a single plane and extending outwardly from the axis of rotation.

4. The blower apparatus according to claim 1, wherein the mechanical clearing device is connected fixedly to a blower wheel of the blower.

5. The blower apparatus according to claim 1, wherein the blower intake is delimited by a rim and wherein the mechanical clearing device extends outwardly across the rim in a radial direction.

6. The blower apparatus according to claim 5, wherein the mechanical clearing device has a radial outer edge and the radial outer edge engages axially the rim.

7. The blower apparatus according to claim 1, wherein the screen has an opening through which a drive means for the mechanical clearing device extends.

8. A blower apparatus comprising:
    a blower housing having a blower intake;
    a motor-driven blower arranged in the blower housing and taking in air in a flow direction through the blower intake into the blower housing; and
    a mechanical clearing device arranged at the blower intake for clearing the blower intake;

a suction opening arranged upstream of the blower intake and an access protection device provided at the suction opening;

a back support plate, wherein the suction opening is arranged between the back support plate and the blower housing.

9. The blower apparatus according to claim 8, wherein the suction opening extends annularly about the mechanical clearing device and wherein the access protection device is formed by at least one annular plate.

10. The blower apparatus according to claim 8, wherein the access protection device has an outer section and an inner section, wherein the outer section is staggered relative to the inner section in a direction of the axis of rotation of the mechanical clearing device.

11. The blower apparatus according to claim 10, wherein the access protection device is comprised of at least two plates and wherein the spacing of the at least two plates relative to one another is smaller than a distance of the staggering between the inner section and the outer section.

12. A blower apparatus comprising:

a blower housing having a blower intake;

a motor-driven blower arranged in the blower housing and taking in air in a flow direction through the blower intake into the blower housing;

a mechanical clearing device arranged upstream of the blower intake for clearing the blower intake, wherein the mechanical clearing device transports sucked-in dirt radially outwardly so that the blower intake is kept free of dirt, wherein the mechanical clearing device is driven in rotation during operation of the blower apparatus; and an annular suction opening surrounding the blower intake and creating a radial intake flow toward the blower intake.

13. The blower apparatus according to claim 12, comprising a back support plate, wherein the suction opening is arranged between the back support plate and the blower housing.

* * * * *